Figure 1:
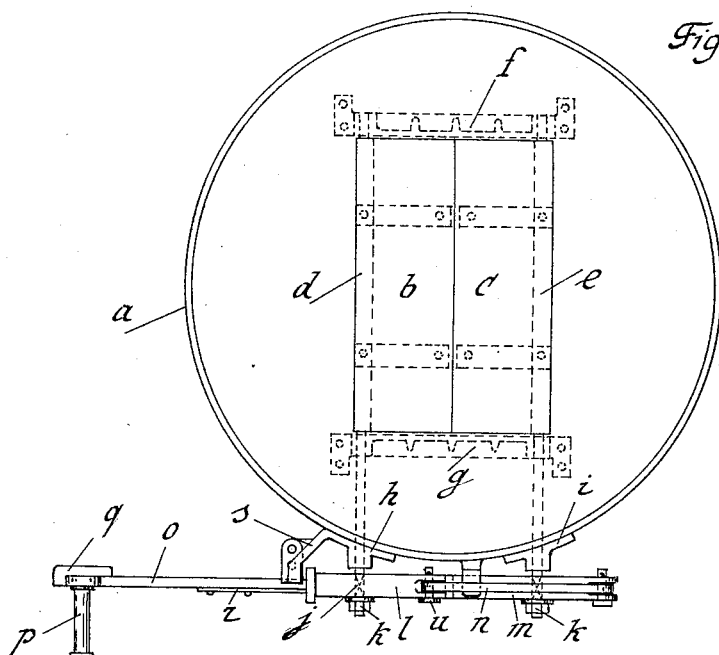

G. EIRICH.
VALVE CLOSURE.
APPLICATION FILED NOV. 18, 1911.

1,051,872.

Patented Feb. 4, 1913.

Witnesses—
Stanley Hood
H. W. Blake

Inventor
Gustav Eirich
by
W.␣␣␣␣
Attorney.

UNITED STATES PATENT OFFICE.

GUSTAV EIRICH, OF HARDHEIM, BADEN, GERMANY.

VALVE-CLOSURE.

1,051,872.  Specification of Letters Patent.  Patented Feb. 4, 1913.

Application filed November 18, 1911. Serial No. 661,079.

*To all whom it may concern:*

Be it known that I, GUSTAV EIRICH, a subject of the German Emperor, residing at Hardheim, Baden, Germany, manufacturer, have invented certain new and useful Valve-Closures, of which the following is a specification.

This invention relates to a device for closing the discharge openings of mixing apparatus, vertical millstones, roasting apparatus and the like, which in the known manner, are composed of two oscillatory flaps.

The known closures composed of flaps have the common feature of the simultaneous opening and closing of the two flaps. According to the present construction this is a disadvantage as material continually adheres to the edges of flaps and on closing becomes jammed in the joint between the two flaps, thus making a good closure impossible, while on opening the closure further jamming and obstructions are caused. These disadvantages are obviated by the present invention. For this purpose, the shafts of the closure flaps are outside the apparatus provided with bell-crank levers which are connected together by means of a spring connecting member in such manner that the flap moved by the connecting member, closes first and opens last. In this manner, on closing a reciprocal cleaning of the joint between the two flaps takes place and a jamming on opening is impossible.

In the drawing is shown a constructional form of the invention.

Figure 2:
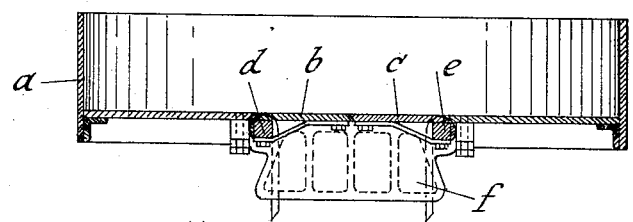
Figure 3:
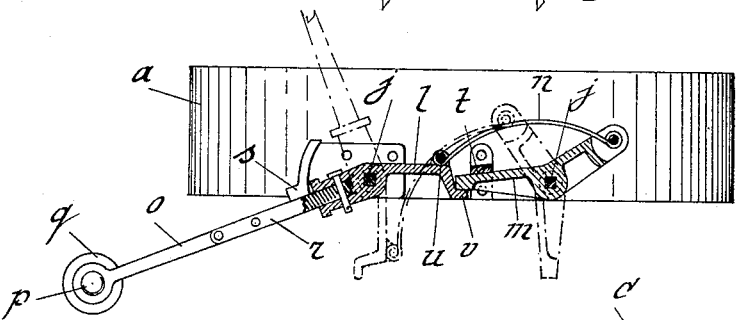
Figure 4:
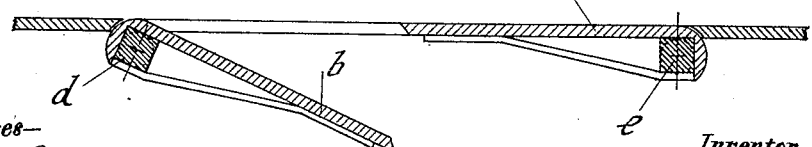

Figure 1 is a plan. Fig. 2 is a cross section through the center. Fig. 3 is a vertical section through the lever mechanism and Fig. 4 shows on an enlarged scale the relation of the two closure flaps at the moment of the flap $c$ reaching its closed position.

The closing of the discharge opening of the mixing box $a$ is effected by means of two flaps $b$ and $c$ which are mounted upon shafts $d$ and $e$, which, along the length of the flaps, are of quadrangular cross section or are worked circular from the solid material and provided with the necessary flat surfaces. Opposite the front sides of the flaps there are provided on the underside of the bottom of the box two plate-like castings $f$ and $g$ which, in combination with the two open flaps form an outlet for the materials which have been mixed and simultaneously serve as bearings for the shafts $d$ and $e$. The projecting ends of the shafts are outside the mixing box mounted in bearings $h$ and $i$ and are at their ends provided with parts $j$ of square cross section and screwed bolts $k$ for the reception of two levers $l$ and $m$, which effect the opening and closing of the flaps. The levers are formed as bell crank levers, and are positively connected together by a hinged spring connecting member $n$. They are operated by a hand lever arm $o$ provided with a handle $p$ and a counterpoise $q$ connected to said lever arm $o$. The hand lever arm is under the control of a spring $r$ by means of which, when the flaps are closed, it is brought into engagement with a pawl $s$, thus securing the flaps in the closed position.

In the open position, the two closing flaps $b$ $c$ hang vertically downward. If the lever $l$ is now moved from the dotted into the full line position by means of the hand lever arm $o$, which is rigidly connected thereto to permit of a rotary movement in a vertical direction, the lever $m$ is also moved by the spring connecting member $n$ or moved toward the lever $l$, and moves in advance of the latter as the connecting member under normal conditions is longer than the distance between its points of connection to the flaps, whereby the flap $c$ which is mounted on the same shaft is also moved in advance of the second flap. The movement of the lever $m$ is limited by means of a projection $t$, projecting from the side of the box $a$ adjacent the lever $m$. The flap $c$ when in this position is closed whereas the flap $b$ (as shown in Fig. 4) is still partly open. On the further rotation of the lever $l$, the spring connecting member $n$ is compressed and the flap $b$ suddenly flies back into its closed position as soon as the bolt $u$ connecting the spring member $n$ to the lever $l$ (Fig. 3) has passed the dead point. In this manner the edges of the two flaps come into contact with one another and the material which adheres thereto is removed. The two flaps $b$ $c$ are secured in this position by the hand lever arm $o$ engaging with the pawl $s$ whereby the projection $v$ of the lever $l$ simultaneously engages under the lever $m$ thus effecting an immovable rigid position of the two flaps. The opening of the two flaps is effected by a reverse operation of the lever arm $o$ and in consequence of the spring connecting member the flap $b$ is partly open before the flap $c$ commences its movement, so that this is moved after the flap b.

What I claim as my invention and desire to secure by Letters Patent is:—

1. A valve closure comprising hinged flaps, a member connecting together said flaps, said member being longer than the distance between its points of connection to the flaps so that on the operation of said flaps one will close later and open earlier than the other, and means for operating said flaps.

2. A valve closure comprising hinged flaps and means for successively opening and closing said flaps, said means comprising shafts upon which said flaps are mounted, levers on said shafts, and a spring member positively connecting said levers, said member being longer than the distance between the points of connection of said member, to said levers.

3. A valve closure comprising two flaps disposed under the opening, members disposed adjacent the ends of said flaps, and means for successively opening and closing said flaps, said means comprising shafts upon which said flaps are mounted, levers on said shafts, and a spring member positively connecting said levers, said member being longer than the distance between the points of connection of said member to said levers.

4. A valve closure comprising hinged flaps and means for successively opening and closing said flaps, said means comprising shafts upon which said flaps are mounted, levers on said shafts, and a spring member positively connecting said levers, said member being longer than the distance between the points of connection of said member, to said levers, a hinged part on one of the levers, a spring controlling said hinged part, and a pawl with which said lever is adapted to engage when the flaps are in the closed position.

In testimony whereof I have hereunto signed my name to this specification in the presence of two subscribing witnesses.

GUSTAV EIRICH.

Witnesses:
A. O. TITTMANN,
MICHAEL MILTENBERGER.